(12) United States Patent
Maruyama

(10) Patent No.: US 7,003,018 B2
(45) Date of Patent: Feb. 21, 2006

(54) PAGING MODE CONTROL METHOD AND APPARATUS

(75) Inventor: Yuichi Maruyama, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 878 days.

(21) Appl. No.: 09/927,745

(22) Filed: Aug. 10, 2001

(65) Prior Publication Data

US 2002/0054620 A1 May 9, 2002

(30) Foreign Application Priority Data

Aug. 22, 2000 (JP) ............................. 2000-250889

(51) Int. Cl.
*H04B 1/69* (2006.01)
(52) U.S. Cl. ..................................... 375/147; 375/148
(58) Field of Classification Search ............... 375/144, 375/148, 349; 455/132, 137, 146, 303, 304
See application file for complete search history.

(56) References Cited

U.S. PATENT DOCUMENTS

| | | | |
|---|---|---|---|
| 5,781,541 A * | 7/1998 | Schneider | 370/335 |
| 5,790,589 A | 8/1998 | Hutchison, IV et al. | |
| 5,949,816 A * | 9/1999 | Okamoto | 375/150 |
| 6,215,814 B1 * | 4/2001 | Ylitalo et al. | 375/148 |
| 6,665,282 B1 * | 12/2003 | Eriksson et al. | 370/332 |
| 6,731,622 B1 * | 5/2004 | Frank et al. | 370/342 |
| 6,813,309 B1 * | 11/2004 | Ogino | 375/148 |

FOREIGN PATENT DOCUMENTS

| | | |
|---|---|---|
| EP | 0 851 593 A2 | 7/1998 |
| EP | 0 889 600 A2 | 1/1999 |
| EP | 0 945 995 A2 | 9/1999 |
| JP | 08-335891 | 12/1996 |
| JP | 10-256984 | 9/1998 |
| JP | 10-327101 | 12/1998 |
| JP | 11-177524 | 7/1999 |
| JP | 2000-022665 | 1/2000 |

OTHER PUBLICATIONS

Abeta, S. 1994 IEEE. DS/CDMA Coherent Detection System with a Suppressed Pilot Channel, pp. 1622-1626.*

* cited by examiner

Primary Examiner—Tesfaldet Bocure
Assistant Examiner—Vineeta Panwalkar
(74) Attorney, Agent, or Firm—Schully, Scott, Murphy & Presser

(57) ABSTRACT

Paging data are more reliably RAKE-received, according to the present invention. A paging mode control method includes the steps of forming a delay profile, searching a path timing on the basis of the delay profile, and performing RAKE receiving on the basis of the path timing. The delay profile includes a first delay profile formed by a speech mode and a second delay profile formed by a paging mode, and a time range of the second profile is wider than a time range of the first profile. With the formation of the second profile, even when the measured paging cycle is not accurate, the paging data can be reliably RAKE-received. The time range of the second delay profile is made wide by connecting a plurality of delay profiles, or by lowering a resolution.

7 Claims, 6 Drawing Sheets

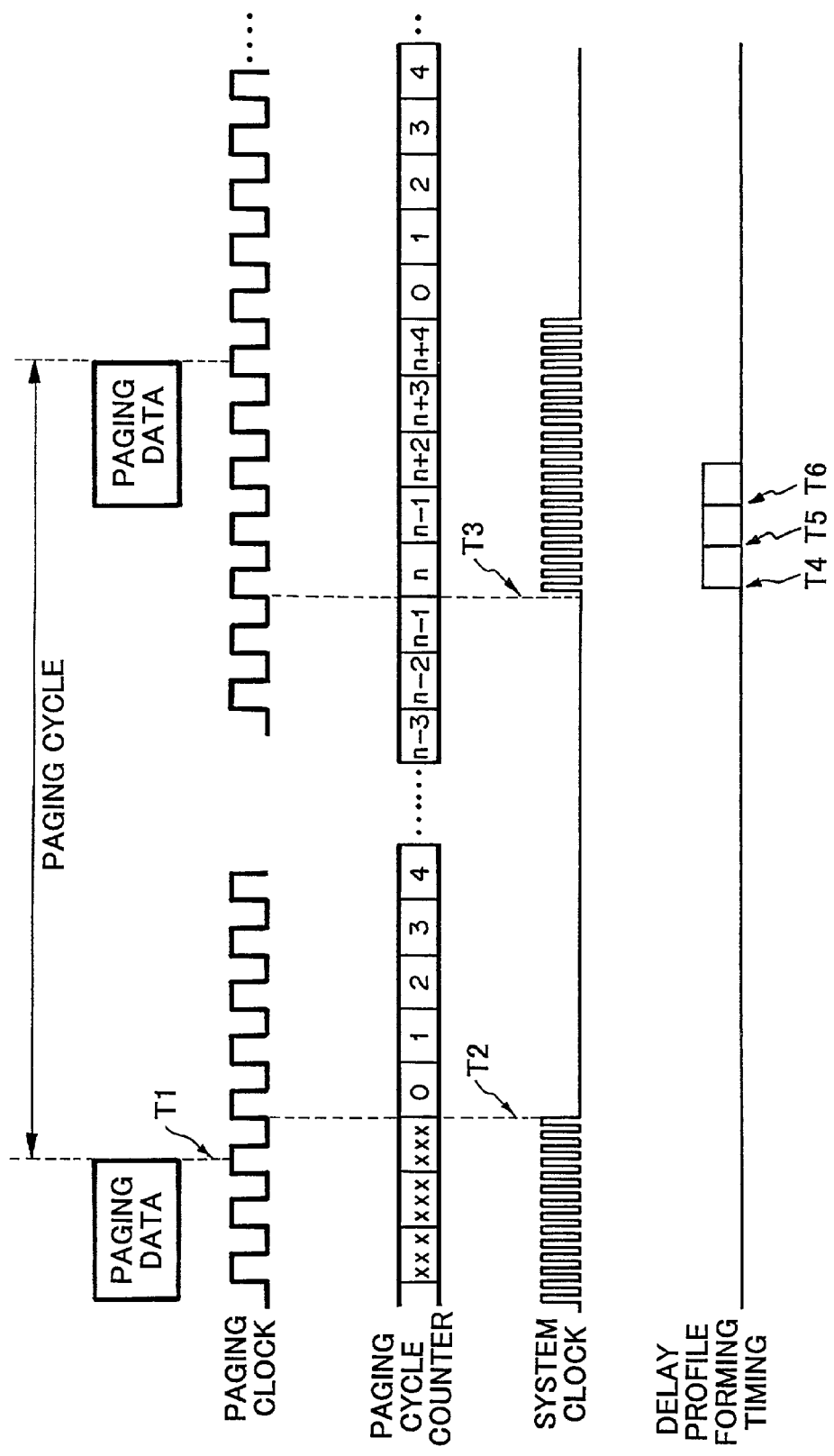

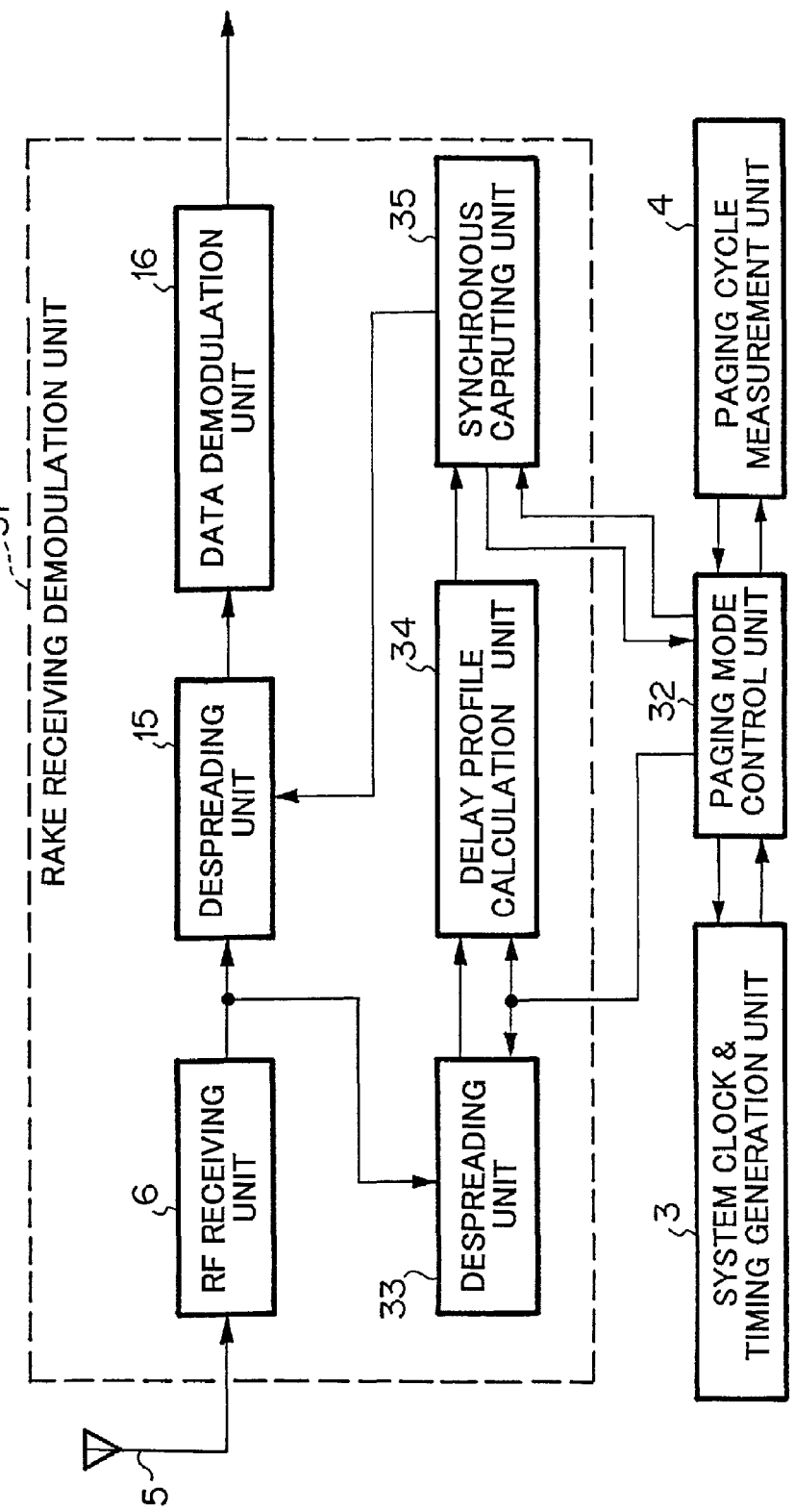

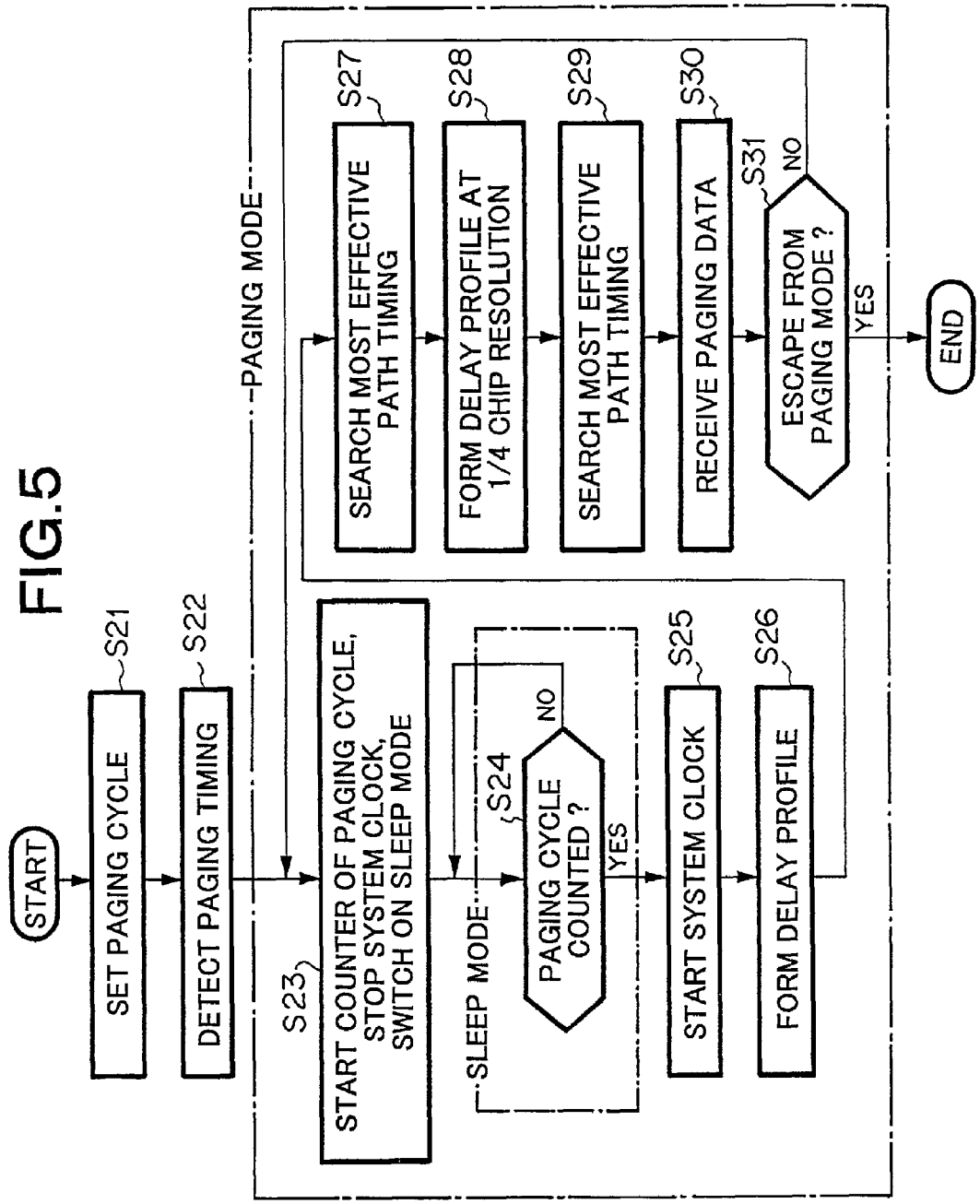

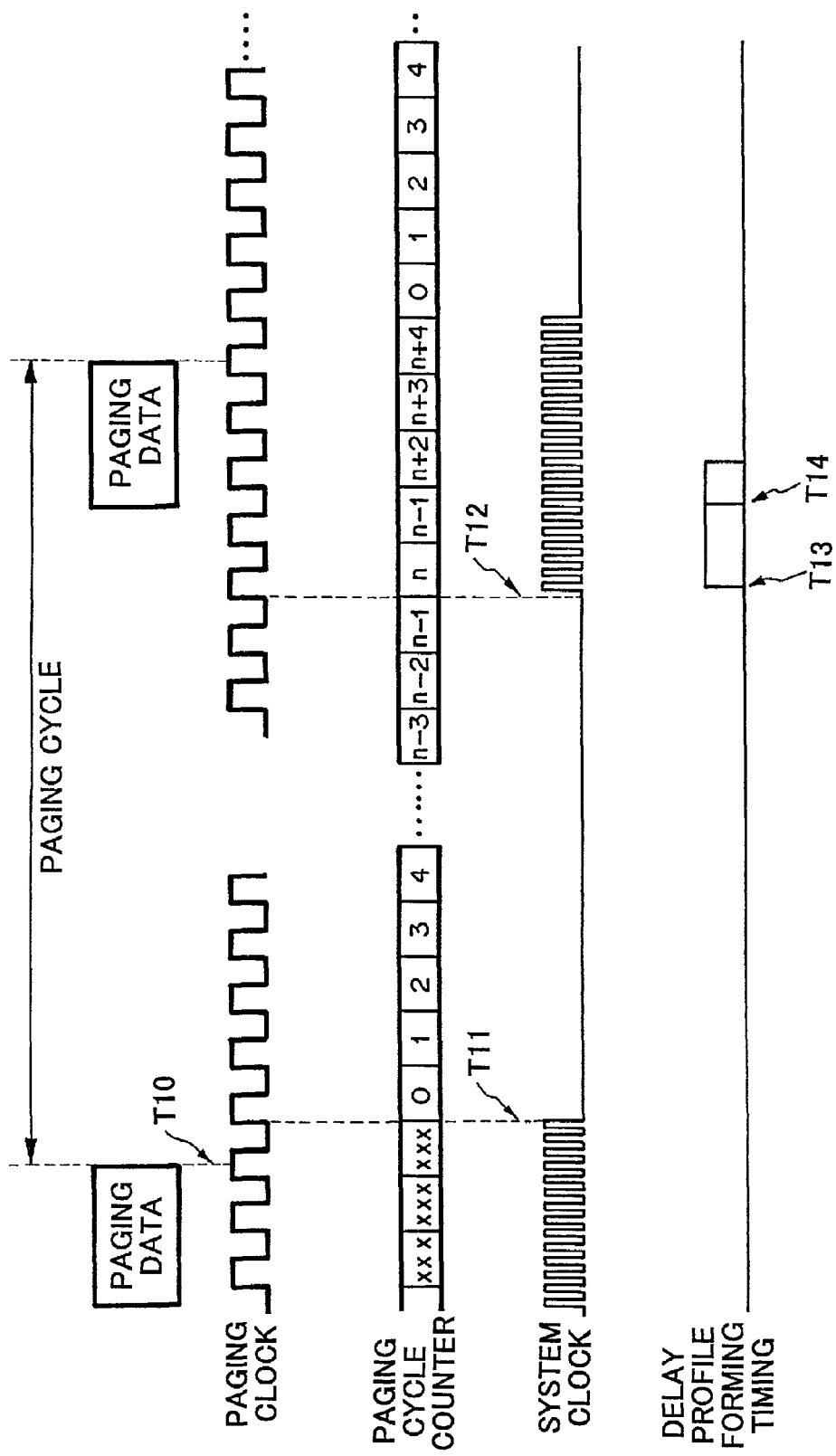

PAGING MODE CONTROL METHOD AND APPARATUS

BACKGROUND OF THE INVENTION

1. Technical Field of the Invention

The present invention relates to a method and apparatus for controlling a paging mode wherein paging data are RAKE-received by a Code Division Multiple Access (CDMA) wireless telephone terminal.

2. Description of the Prior Art

In a wireless telephone terminal, paging data reception is not continuously monitored in a paging mode in order to reduce a power consumption. More specifically, the wireless telephone terminal operates only a minimum circuit required for receiving paging data every paging cycle in which the base station intermittently outputs paging data. Upon a completion of the reception of the paging data, the wireless telephone terminal switches off the paging mode and switches on a sleep mode in which a power supply for a receiving circuit for receiving the paging data is turned off. Every arrival of a paging cycle, the wireless telephone terminal operates only a minimum circuit required for receiving paging data, and, upon completion of the reception of the paging data, the wireless telephone terminal repeats an operation for shifting the paging mode to the sleep mode.

In the sleep mode, only a circuit for measuring a paging cycle is operated. A system clock required for transmitting and receiving operations of the wireless telephone terminal has a high resolution and consumes electric power very much. Therefore, in order to measure the paging cycle, a paging clock having a relatively low resolution and a small power consumption is used. For example, the paging clock is 32 kHz or 32.768 kHz.

In the sleep mode, an offset of a clock count having a low resolution is estimated. Therefore, a high resolution system clock is switched on before several pulses of the low resolution paging clock. Thus, the paging data are received on the basis of the system clock.

An excessive power consumed by about 31.25 μsec to 100 μsec corresponding to the time period of several clocks of 32 kHz can be neglected, because time required when the system clock starts to receive paging data is about 100 msec.

A next-generation portable wireless telephone system International Mobile Telecommunication-2000 (IMT-2000) employs the CDMA wherein transmission data are subjected to spread spectrum modulation by using a pseudo-noise code having a frequency bandwidth wider than that of the transmission data.

A signal transmitted from the base station is reflected and diffracted by mountains, buildings, and the like to reach a portable wireless terminal through a plurality of transmission paths. Therefore, the signal received by the portable wireless terminal consists of a plurality of waves. Therefore, as a receiving modulation system of the portable wireless terminal, a RAKE receiving system is used. In the RAKE receiving system, a received signal converted from a Radio Frequency (RF) bandwidth to a base band is despread, so that a plurality of waves included in the received wave are separated. The separated signals are combined to obtain a demodulation output of the received signal.

A delay profile is formed to perform RAKE receiving, and a wireless transmission path is searched on the basis of the delay profile. The position of the searched transmission path must be subjected to RAKE combining. The delay profile is obtained by plotting delay times of radio waves reaching a reception point on an abscissa, and plotting the powers of the radio waves on an ordinate. A delay profile forming range used for RAKE receiving is generally about several tens μsec.

However, the rise up of a paging cycle measured by the paging clock does not occur simultaneously when the paging data arrive, because a paging clock having a low resolution is used to measure a paging cycle. In consideration of this error, the time range for forming the delay profile in the paging mode is 50 to 100 μsec or less of the width of the paging clock plus several tens μsec which is a time range for forming a delay profile in the speech mode.

Further, in the paging mode, a memory size required for the delay profile must be several times larger than that required for a speech mode.

SUMMARY OF THE INVENTION

An object of the present invention is to provide a paging mode control method and apparatus which can more reliably RAKE-receive paging data.

Another object of the present invention is to provide a paging mode control method and apparatus which can reliably RAKE-receive paging data and which does not have to increase a memory size.

The paging mode control method of the present invention includes the steps of forming a delay profile, searching a path timing on the basis of the delay profile, and performing RAKE receiving on the basis of the path timing, the delay profile includes a first delay profile formed by a mode and a second delay profile formed by a paging mode, and a range of the second profile is wider than a range of the first profile. When predicted time at which paging data are received is offset, the second delay profile having a range wider than the offset is formed. For this reason, the paging data can be reliably RAKE-received.

The paging mode control method further includes the step of measuring a paging cycle of paging data intermittently originated by using a paging clock, and the range of the second delay profile is larger than a cycle of the paging clock. When a paging cycle is measured by using the paging clock, an offset between the measurement result and an actual paging cycle is the cycle of the paging clock at most. For this reason, the range of the second delay profile is preferably equal to or larger than the cycle of the paging clock.

The second delay profile is preferably formed by connecting the plurality of first delay profiles to each other. At this time, although a memory for recording the second delay profile requires a capacity which is several times a memory for recording the first delay profile, it is better than that the paging data cannot be RAKE-received.

A resolution of the second delay profile is lower than a resolution of the first delay profile, the delay profile further includes a third delay profile formed by the paging mode, a resolution of the third delay profile is equal to the resolution of the first delay profile, and the paging mode control method according to the present invention further includes the step of forming the third delay profile with respect to a range including the path timing searched on the basis of the second delay profile. When the resolutions are made low as described above, even though an amount of information of the first delay profile and an amount of information of the second delay profile are equal to each other, the forming range of the second delay profile is a wide range. More specifically, a memory for recording the delay profiles does not have to be increased to record the second delay profile.

The paging mode control apparatus of the present invention includes a delay profile calculation unit for forming a delay profile, and a RAKE receiving demodulator for performing RAKE receiving on the basis of the delay profile, and the delay profile includes a first delay profile formed by a speech mode and a second delay profile formed by a paging mode, and a forming range of the second profile is wider than a forming range of the first profile. When predicted time at which paging data are received is offset, the second delay profile having a range wider than the offset is formed. For this reason, the paging data can be reliably RAKE-received. At this time, when a paging cycle is measured by using a paging clock, an offset between the measurement result and an actual paging cycle is the cycle of the paging clock at most. For this reason, the range of the second delay profile is preferably equal to or larger than the cycle of the paging clock.

The paging mode control apparatus of the present invention further includes a paging mode control unit and a plurality of delay profile calculation units. The paging mode control unit notifies the plurality of profile calculation units of timings at which delay profiles are formed, respectively, and the plurality of delay profiles formed by the plurality of delay profile calculation units are preferably connected to each other to form the second delay profile. At this time, although a memory for recording the second delay profiles requires a capacity which is several times the capacity of a memory for recording the first delay profile, it is better than that the paging data cannot be RAKE-received.

The paging mode control apparatus of the present invention further includes a paging mode control unit for notifying the delay profile calculation unit of a resolution, the delay profile calculation unit forms the delay profile by the notified resolution, a resolution of the second delay profile is lower than a resolution of the first delay profile, the RAKE receiving demodulator searches a path timing on the basis of the second delay profile, the delay profile further includes a third delay profile formed by a resolution equal to that of the first delay profile in a paging mode, and the path timing is included in a range of the third delay profile. When the resolutions are made low as described above, even though an amount of information of the first delay profile and an amount of information of the second delay profile are equal to each other, the forming range of the second delay profile is wide. Therefore, the memory capacity needs not be increased for recording the second delay profile. Since the path timing searched on the basis of the second delay profile having a low resolution is rough, the third delay profile is formed to search an exact path timing.

According to the present invention, paging data can be RAKE-received reliably.

BRIEF EXPLANATION OF THE DRAWINGS

FIG. 3 is a timing chart related to the operation in FIG. 2.

FIG. 4 is a block diagram showing another embodiment of a paging mode control apparatus according to the present invention.

FIG. 5 is a flow chart showing another embodiment of a paging mode control method according to the present invention.

FIG. 6 is a timing chart related to the operation in FIG. 5.

PREFERRED EMBODIMENT OF THE INVENTION

Figure 1:
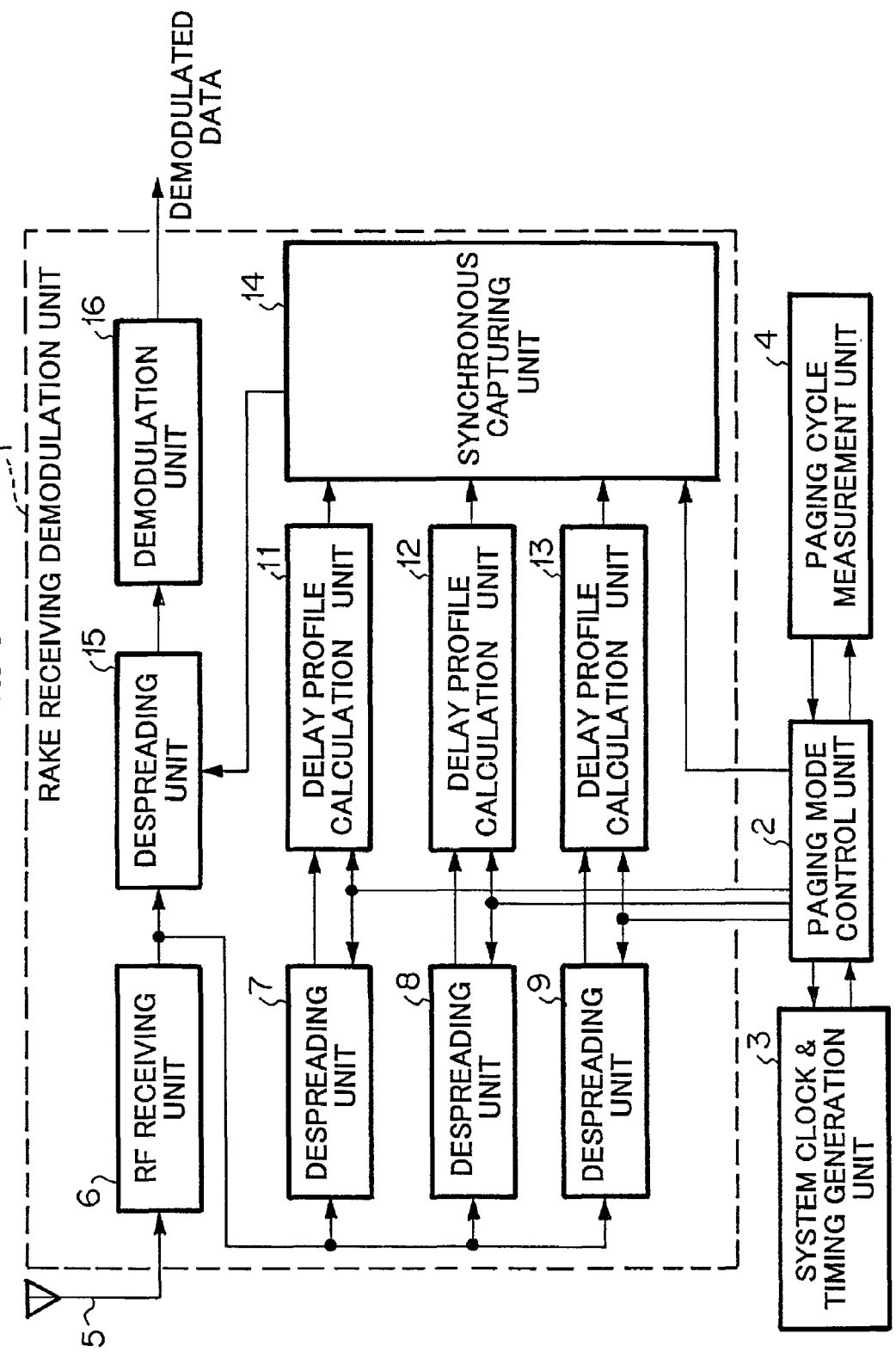
FIG. 1 is a block diagram showing an embodiment of a paging mode control apparatus according to the present invention.

With reference to the accompanying drawings, in an embodiment of a paging mode control apparatus according to the present invention, a RAKE receiving demodulator is arranged together with a paging mode control unit. The RAKE receiving demodulator 1, as shown in FIG. 1, is connected to a paging mode control unit 2. The paging mode control unit 2 has a system clock timing generation unit 3 and a paging cycle measurement unit 4. The RAKE receiving demodulator 1 has an antenna 5, receives a reception carrier signal from the antenna 5, and generates and outputs demodulation data.

The paging mode control unit 2 notifies the paging cycle measurement unit 4 of a paging cycle to instruct the paging cycle measurement unit 4 to start a paging cycle measurement. The paging cycle is a cycle in which a base station intermittently outputs paging data. The paging mode control unit 2 further instructs the system clock timing generation unit 3 to start or stop generation of a system clock. The paging mode control unit 2 further notifies the RAKE receiving demodulator 1 of an operation start timing at which a delay profile is formed to instruct the RAKE receiving demodulator 1 to perform a synchronous capturing method.

The system clock timing generation unit 3 generates a system clock, and supplies the system clock to the RAKE receiving demodulator 1. The system clock timing generation unit 3 further starts or stop the system clock by an instruction of the paging mode control unit 2. The system clock timing generation unit 3 further detects a system timing in a CDMA system from reception data, and output the system timing to the paging mode control unit 2.

The paging cycle measurement unit 4 has a paging clock. By an instruction for starting count of the paging mode control unit 2, the paging cycle measurement unit 4 notifies the paging mode control unit 2 of an elapse of the paging cycle when the paging cycle elapses from the instruction. The paging cycle is expressed by a count value "n" ("n" is a positive integer) of paging clocks.

The RAKE receiving demodulator 1 comprises a RF receiving unit 6, despreading units 7 to 9, delay profile calculation units 11 to 13, a synchronous capturing unit 14, a data despreading unit 15, and a data demodulation unit 16. The RF receiving unit 6 receives a reception carrier signal from the antenna 5, converts the reception carrier signal into a baseband spread spectrum signal, and outputs the base band spread spectrum signal to the despreading units 7 to 9 to the data despreading unit 15.

The despreading units 7 to 9 generate correlation values on the basis of a forming timing of a delay profile notified by the paging mode control unit 2 and the base band spread spectrum signal. The despreading units 7 to 9 output the generated correlation values to the delay profile calculation units 11 to 13, respectively. The delay profile calculation units 11 to 13 generate delay profiles on the basis of the correlation values and the forming timing of the delay profile notified by the paging mode control unit 2. In a speech mode, only one delay profile calculation unit of the three delay profile calculation units 11 to 13 forms a delay profile. In a paging mode, the three delay profile calculation units 11 to 13 form delay profiles. The delay profile calculation units 11 to 13 output the generated delay profiles to the synchronous capturing unit 14.

The synchronous capturing unit 14 has a memory which can record three delay profiles, and records the three delay profiles output from the delay profile calculation units 11 to 13 in the memory. The synchronous capturing unit 14 further generates a path timing (selective path phase) on the basis of the three delay profiles and a synchronous capturing method designated by the paging mode control unit 2. The synchronous capturing unit 14 outputs the generate path timing to the data despreading unit 15. The data despreading unit 15 despread a base band spread spectrum signal on the basis of the path timing. The data demodulation unit 16 outputs the despread base band spread spectrum signal to the data demodulation unit 16. The data demodulation unit 16 demodulates the base band signal, and outputs the demodulated data.

In this embodiment, the RAKE receiving demodulator 1 has only one data despreading unit. However, a RAKE receiving apparatus generally comprises a plurality of data despreading units. When the RAKE receiving demodulator 1 comprises a plurality of data despreading units, the synchronous capturing unit 14 searches path timings the number of which is equal to the number of data despreading units to set the path timings in the data despreading units, respectively. In this manner, the paging mode control apparatus according to the present invention can also be executed with respect to a general RAKE receiving apparatus.

Figure 2:
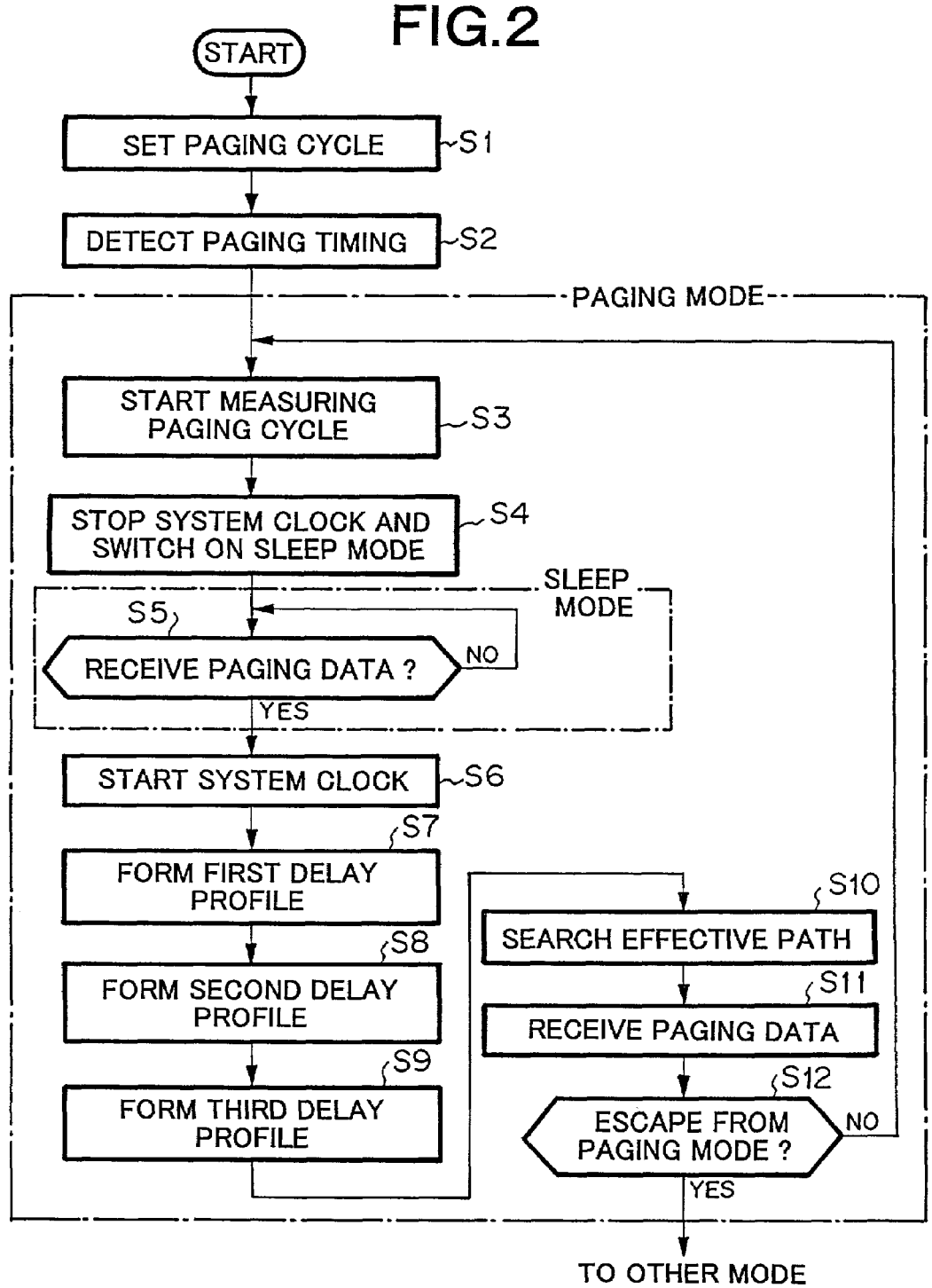
FIG. 2 is a flow chart showing the embodiment of a paging mode control method according to the present invention.

FIG. 2 shows an operation of the paging mode control apparatus according to the present invention in a paging mode. The system clock timing generation unit 3 initially supplies a system clock to the RAKE receiving demodulator 1. First, the paging mode control unit 2 notifies the paging cycle measurement unit 4 of a paging cycle before the paging mode is set (step S1). The notified paging cycle is set as a cycle which is shorter than an actual paging cycle by several clocks in consideration of an offset of the count of the page clocks (step S2). The paging timing is a timing at which reception of the first paging data is completed.

After the paging timing is detected, the paging mode control unit 2 instructs the paging cycle measurement unit 4 to measure a paging cycle (step S3). The paging cycle measurement unit 4 starts to count paging clocks by an instruction from the paging mode control unit. The paging mode control unit 2 further instructs the system clock timing generation unit 3 to stop the system clock (step S4). The system clock timing generation unit 3 stops the system clock by an instruction from the paging mode control unit 2. The system clock is stopped to stop the function of the RAKE receiving demodulator 1, so that the RAKE receiving demodulation unit 1 is set a sleep mode. The order of step S3 and step S4 is not regarded. The processes may be performed while changing the order, and the processes may be simultaneously performed.

The paging cycle measurement unit 4 detects from a notification of measurement whether the paging cycle has elapsed or not (step S5). More specifically, after counting the paging clocks is started, the paging cycle measurement unit 4 detects whether the count value is n. When the count number is n, the paging cycle measurement unit 4 notifies the paging mode control unit 2 that the paging cycle has elapsed. In a sleep mode, the paging mode control unit 2 monitors notification of the paging cycle measurement unit 4.

The paging mode control unit 2 instructs the system clock timing generation unit 3 to start the system clock in response to notification of the elapse of the paging cycle. The RAKE receiving demodulator 1 returns from the sleep mode to the paging mode by the start of the system clock to start preparation of paging data reception (step S6). After the RAKE receiving demodulator 1 returns from the sleep mode, the paging mode control unit 2 designates a forming timing for forming a delay profile to the despreading units 7 to 9 and the delay profile calculation units 11 to 13.

The paging mode control unit 2 further notifies the synchronous capturing unit 14 of a synchronous capturing method. More specifically, the most effective path timing is detected from the three delay profiles respectively input from the three delay profile calculation units 11 to 13 to instruct the data despreading unit 15 to output the path timing.

The despreading unit 7 outputs a correlation value to the delay profile calculation unit 11 by an instruction from the paging mode control unit 2 on the basis of a base band spread spectrum signal output from the RF receiving unit 6. The delay profile calculation unit 11 calculates a delay profile from the correlation value by an instruction from the paging mode control unit 2, and outputs an operation result to the synchronous capturing unit 14 (step S7).

The despreading unit 8 outputs a correlation value to the delay profile calculation unit 12 by an instruction from the paging mode control unit 2 on the basis of a base band spread spectrum signal output from the RAKE receiving demodulator 1. The delay profile calculation unit 12 calculates a delay profile from the correlation value by an instruction from the paging mode control unit 2, and outputs an operation result to the synchronous capturing unit 14 (step S8). A forming timing designated at this time is a timing at which a delay profile forming range has elapsed from a timing at which the delay profile calculation unit 12 is designated. The delay profile forming range corresponds to the size of a memory in which a delay profile is recorded.

The despreading unit 9 outputs a correlation value to the delay profile calculation unit 13 by an instruction from the paging mode control unit 2 on the basis of a baseband spread spectrum signal output from the RAKE receiving demodulator 1. The delay profile calculation unit 13 calculates a delay profile from the correlation value by an instruction from the paging mode control unit 2, and outputs an operation result to the synchronous capturing unit 14 (step S9). A forming timing designated at this time is a timing at which a delay profile forming range has elapsed from a timing at which the delay profile calculation unit 11 is designated.

The synchronous capturing unit 14 connects the three delay profiles to each other to record the connected delay profiles in a memory as a delay profile having a wide range. Since the wide range of the delay profile is larger than an offset between a paging cycle measured by the paging clock and a paging data arrival timing, the most effective path timing is reliably set within the wide range of the delay profile.

The synchronous capturing unit 14 searches the most effective path timing from the delay profile having the wide range to notify the data despreading unit 15 of the path timing (step S10). As the most effective path timing, a path timing having the largest correlation value is selected. A signal-to-interference ratio (SIR) of a reception signal, and a path timing having the best SIR is selected.

The data despreading unit 15 despreads a base band spread spectrum signal input from the RF receiving unit 6 at a designated path timing, and outputs the base band signal to the data demodulation unit 16. The data demodulation unit 16 demodulates the base band signal (step S11). After the demodulated data are outputted, it is decided whether the control operation must be out of the paging mode (step S12).

When the control operation does not have to be out of the paging mode, the processes in step S3 to step S12 are repeated. After paging data are decoded, when the control operation must be out of the paging mode, the RAKE receiving demodulator 1 is out of the paging mode and shifts to another mode.

The time chart in FIG. 3 shows paging data, a paging clock, a paging cycle counter value, the state of a system clock, and a delay profile forming timing. The paging clock is always supplied to the paging cycle measurement unit 4. Initially, the RAKE receiving demodulator 1 is set in a state except for the paging mode, and the system clock is supplied to the RAKE receiving demodulator 1.

When the paging data are received, in a period of time from time T1 at which the end of reception of paging data are detected to a trailing edge T2 of the first paging clock, a paging cycle counter value is started to be counted, and a system clock is stopped. A period of time from the end T1 of the reception of the paging data to the trailing edge T2 of the paging clock is shorter than the cycle of the paging clock, and is shorter than a period of time which is three times the range of one delay profile.

The stop of the system clock shifts the RAKE receiving demodulator 1 to a sleep mode. With respect to the paging cycle, a paging cycle counter value corresponds to (n+4), and the paging cycle measurement unit 4 notifies the paging mode control unit 2 of an elapse of the paging cycle before several clocks, e.g., before four clocks in this embodiment. More specifically, the paging cycle measurement unit 4 notifies the paging mode control unit 2 of the elapse of the paging cycle at a paging cycle counter value "n".

At time T3 at which the paging counter value is "n", the system clock is started. When the system clock is started, the control operation is out of the sleep mode, and the paging mode control unit 2 forms three delay profiles. At time T5 a delay profile range after time T4 at which forming the first delay profile of the three delay profiles is started, the second delay profile is formed. At time T6 a delay profile range after time T5, the third delay profile is formed. The three delay profiles are connected to each other. The connected delay profiles are used as a delay profile having a wide range.

A path timing is searched on the basis of the delay profile having the wide range, and paging data are RAKE-received and synthesized by the path timing. Upon completion of reception of the paging data, if the control operation does not have to be out of the paging mode, the system clock is stopped again, and the operation shifts to a sleep mode. When the RAKE receiving demodulator 1 must shift to a mode except for the paging mode, the RAKE receiving demodulator 1 shifts to the mode.

When the path timing is searched as described above, the path timing can be searched from the wide range, and the paging data can be more reliably RAKE-received. The capacity of the memory of the RAKE receiving apparatus according to the present invention is three times the capacity of the memory of a conventional RAKE receiving apparatus. However, it is better that the capacity of the memory than that paging data cannot be RAKE-received.

FIG. 4 shows another embodiment of a paging mode control apparatus according to the present invention. In another embodiment of the paging mode control apparatus according to the present invention, a RAKE receiving demodulator comprises one despreading unit and one delay profile calculation unit, and is arranged together with a paging mode control unit. A RAKE receiving demodulator 31, as shown in FIG. 4, comprises a RF receiving unit 6, a data despreading unit 15, a data demodulation unit 16, a despreading unit 33, a delay profile calculation unit 34, and a synchronous capturing unit 35. The RF receiving unit 6, the data despreading unit 15, and the data demodulation unit 16 correspond to the same parts in the previous embodiment, respectively, and operate in the same manners as in the previous embodiment.

A paging mode control unit 32 notifies a paging cycle measurement unit 4 of a paging cycle and instructs the paging cycle measurement unit 4 to start measurement of the paging cycle. The paging cycle is a cycle in which a base station intermittently outputs paging data. A paging mode control unit 32 further instructs a system clock timing generation unit 3 to start or stop generation of a system clock. The paging mode control unit 32 further notifies the RAKE receiving demodulator 31 of an operation start timing of delay profile forming and an operational resolution, and designates a synchronous capturing method. The operational resolution is a chip resolution or ¼ chip resolution.

The despreading unit 33 generates correlation values on the basis of a baseband spread spectrum signal output from a RF receiving unit, an operation start timing notified by the paging mode control unit 32, and the operational resolution. The despreading unit 33 outputs the generated correlation values to the delay profile calculation unit 34.

The delay profile calculation unit 34 generates a delay profile on the basis of the correlation values, the operation start timing of the delay profile notified by the paging mode control unit 32, and the operational resolution. The delay profile calculation unit 34 outputs the generated delay profile to the synchronous capturing unit 35.

The synchronous capturing unit 35 has a memory which can record one delay profile, and generates a path timing on the basis of the delay profile and a synchronous capturing method designated by the paging mode control unit 32. The synchronous capturing unit 35 outputs the generated path timing to the data despreading unit 15 or the paging mode control unit 32. More specifically, the path timing generated from the delay profile formed at the chip resolution is output to the paging mode control unit 32, and the path timing generated from the delay profile formed at the ¼ chip resolution is output to the data despreading unit 15.

FIG. 5 shows an operation of the paging mode control apparatus according to this embodiment in a paging mode. The system clock timing generation unit 3 initially supplies a system clock to a RAKE receiving demodulation unit 31. The paging mode control unit 32 notifies a paging cycle measurement unit 4 of a paging cycle before a paging mode is set (step S21). The paging cycle to be notified is set to be a paging cycle which is shorter than an actual paging cycle by several clocks in consideration of an offset of the count of paging clocks. The paging mode control unit 32 detects a paging timing (step S22).

When the paging timing is detected, the paging mode control unit 32 instructs the paging cycle measurement unit 4 to measure a paging cycle. The paging cycle measurement unit 4 starts to count paging clocks. The paging mode control unit 32 further instructs the system clock timing generation unit 3 to stop the system clock (step S23). The system clock timing generation unit 3 stops the system clock by an instruction from the paging mode control unit 32. The system clock is stopped to stop the function of the RAKE receiving demodulator 31, so that the RAKE receiving demodulation unit 31 is set a sleep mode.

The paging cycle measurement unit 4 detects from a notification of measurement whether the paging cycle has elapsed (step S24). More specifically, it is detected whether the count value is n after the count of the paging clocks is started. When the count value is n, the paging cycle measurement unit 4 notifies the paging mode control unit 32 that the paging cycle has elapsed. In a sleep mode, the paging mode control unit 32 monitors notification of the paging cycle measurement unit 4.

The paging mode control unit 32 instructs the system clock timing generation unit 3 to start the system clock in response to the notification of the elapse of the paging cycle. The RAKE receiving demodulator 31 returns from the sleep mode to the paging mode by the start of the system clock, and starts preparation of reception of paging data (step S25). After the RAKE receiving demodulator 31 returns from the sleep mode, the paging mode control unit 32 designates a forming timing for forming a delay profile to the despreading 33 and the delay profile calculation unit 34, and instructs the despreading unit 33 and the delay profile calculation unit 34 to form a delay profile at the chip resolution.

The paging mode control unit 32 further notifies the synchronous capturing unit 35 of a synchronous capturing method. More specifically, the most effective path timing is detected from the delay profile of the chip resolution, and the paging mode control unit 32 is instructed to output the path timing.

The despreading unit 33 generates a correlation value of the chip resolution at the forming timing obtained from the paging mode control unit 32, and outputs the generated correlation value to the delay profile calculation unit 34. The delay profile calculation unit 34 calculates the delay profile of the chip resolution from the correlation value, and outputs an operation result to the synchronous capturing unit 35 (step S26). The synchronous capturing unit 35 records the delay profile in the memory.

The synchronous capturing unit 35 searches the most effective path timing from the recorded delay profile, and notifies the paging mode control unit 32 of the path timing (step S27). A probability that a path timing which is truly required exists near the rough path timing obtained as described above is high.

The paging mode control unit 32 instructs the despreading unit 33 and the delay profile calculation unit 34 to form a delay profile at the ¼ chip resolution in a range including the notified path timing. By an instruction from the paging mode control unit 32, the despreading unit 33 and the delay profile calculation unit 34 form a delay profile at the ¼ chip resolution (step S28). The delay profile formed at the ¼ chip resolution is input to the synchronous capturing unit 35 again to search a path timing, and the synchronous capturing unit 35 searches the most effective path timing, and outputs the path timing to the data despreading unit 15 (step S29).

When the path timing is searched as described above, the path timing can be searched from a wide range, and paging data can be more reliably RAKE-received. In addition, the memory size of the synchronous capturing unit does not have to be increased.

The data despreading unit 15 inversely diffuses a baseband spread spectrum signal input from the RF receiving unit 6 at a designated path timing, and outputs the inversely diffused baseband spread spectrum signal to the data demodulation unit 16. The data demodulation unit 16 demodulates the despread baseband signal to output the demodulated signal (step S30). After the demodulated data are outputted, it is decided whether the control operation must be out of the paging mode (step S31). When the control operation does not have to be out of the paging mode, the processes in step S23 to step S31 are repeated. When the control operation must be out of the paging mode, the RAKE receiving demodulator 31 is out of the paging mode and shifts to another mode.

The time chart in FIG. 6 shows paging data, a paging clock, a paging cycle counter value, the state of a system clock, and a delay profile forming timing. In a period of time from time T10 at which the end of reception of paging data are detected to a leading edge T11 of the first paging clock, a paging cycle counter value is started to be counted, and a system clock is stopped. A period of time from the end T10 of the reception of the paging data to the trailing edge T11 of the paging clock is shorter than the range of the delay profile formed at the chip resolution.

The stop of the system clock shifts the RAKE receiving demodulator 31 to a sleep mode. With respect to the paging cycle, a paging cycle counter value corresponds to (n+4), and the paging cycle measurement unit 4 notifies the paging mode control unit 32 of an elapse of the paging cycle. At time T12 at which the paging counter value is "n", the system clock is started. When the system clock is started, the control operation is out of the sleep mode, and the paging mode control unit 32 starts to form a delay profile at the chip resolution (time T13). The most effective path timing of the delay profile is detected, and a delay profile near the path timing is formed at the ¼ chip resolution (time T14).

A path timing is searched on the basis of the delay profile formed at the ¼ chip resolution, and paging data are RAKE-received and synthesized by the path timing. Upon completion of reception of paging data, the system clock is stopped again, and the RAKE receiving demodulator 31 shifts to the sleep mode. When the operation must shift to other mode except for the paging mode, the operation shifts to the other mode.

What is claimed is:

1. A paging mode control method comprising the steps of:
   forming a delay profile;
   searching a path timing on the basis of said delay profile; and
   RAKE-receiving paging data on the basis of said path timing,
   wherein said delay profile includes a first delay profile formed by a speech mode and a second delay profile formed by a paging mode; and
   a time range of said second delay profile is wider than that of said first delay profile.

2. The paging mode control method according to claim 1, further comprising the step of measuring a paging cycle of said paging data intermittently originated by using a paging clock,
   wherein said time range of said second delay profile is larger than a cycle of said paging clock.

3. The paging mode control method according to claim 1, wherein said second delay profile is formed by connecting a plurality of said first delay profiles to each other.

4. The paging mode control method according to claim 1, wherein:
   a resolution of said second delay profile is lower than that of said first delay profile;
   said delay profile further includes a third delay profile formed by the paging mode;
   a resolution of said third delay profile is equal to that of said first delay profile,
   which further comprises the step of forming said third delay profile with respect to a range including said path timing searched on the basis of said second delay profile.

5. A paging mode control apparatus comprising:
one or more delay profile calculation units for forming a delay profile; and
a RAKE-receiving demodulator for RAKE-receiving paging data on the basis of said delay profile,
wherein:
said delay profile includes a first delay profile formed by a speech mode and a second delay profile formed by a paging mode; and
a time range of said second profile is wider than that of said first profile.

6. The paging mode control apparatus according to claim 5, further comprising a paging mode control unit for controlling a plurality of said delay profile calculation units,
wherein said paging mode control unit notifies said plurality of profile calculation units of timings at which said delay profiles are formed, respectively, and connects said plurality of delay profiles formed by said plurality of delay profile calculation units to form said second delay profile.

7. The paging mode control apparatus according to claim 5, wherein:
said paging mode control unit notifies the delay profile calculation unit of a resolution;
said delay profile calculation unit forms said first delay profile on the basis of the notified resolution;
a resolution of said second delay profile is made lower than that of said first delay profile;
said RAKE-receiving demodulator searches a path timing on the basis of said second delay profile;
said delay profile further includes a third delay profile formed in a paging mode by said notified resolution; and
said path timing is included in a time range of said third delay profile.

* * * * *